United States Patent [19] — Lichtin et al. [11] 4,052,536 [45] Oct. 4, 1977

[54] ELECTROLYTES WHICH ARE USEFUL IN SOLAR ENERGY CONVERSION

[75] Inventors: Norman N. Lichtin, Newton Center; Peter D. Wildes, Belmont, both of Mass.

[73] Assignee: The Trustees of Boston University, Boston, Mass.

[21] Appl. No.: 699,725

[22] Filed: June 24, 1976

[51] Int. Cl.² .................................. H01M 4/36
[52] U.S. Cl. ........................... 429/105; 429/111; 429/198; 252/301.16; 252/62.2
[58] Field of Search ............... 429/111, 198, 105; 136/89 NB, 89 HY; 252/301.16, 62.2

[56] References Cited

U.S. PATENT DOCUMENTS

| 3,591,420 | 7/1971 | Streed | 136/89 |
| 3,912,931 | 10/1975 | Gravisse et al. | 250/458 |
| 3,989,542 | 11/1976 | Clark | 136/89 |

OTHER PUBLICATIONS

H. Gerischer, "Electrochemical Techniques for the Study of Photosensitization," Photochem & Photobiol, vol. 16, pp. 5243-5260 (1972).
H. Gerischer et al., "Sensitization of Charge Injection into Semiconductors with Large Band Gap," Electrochim.Acta, vol. 13, pp. 1509-1515 (1968).
N. Kamiya et al., "Studies on Photoelectrochemical Cell Containing Methyl Viologen Redox System," Kogyo Kagaku Zasshi, vol. 72, pp. 96-100 (1969).
W. D. K. Clark et al., "Photogalvanic Cells," Solar Energy, vol. 17, pp. 147-150 (1975).
R. Gomer, "Photogalvanic Cells," Solar Energy, vol. 20, pp. 13-20 (1975).
M. Eisenberg et al., "Photoelectrochemical Cells," Electrochim.Acta, vol. 5, pp. 1-12 (1961).
R. A. Hann et al., "Photogalvanic Output from Cells Containing Organic Dye," Nature Phys. Sci., vol. 244, Aug. 20, 1973, pp. 126-127.

Primary Examiner—John H. Mack
Assistant Examiner—Aaron Weisstuch
Attorney, Agent, or Firm—David E. Brook

[57] ABSTRACT

Electrolytes are disclosed which are useful in solar energy conversion and which have a wider range of wavelength response and enhanced activity compared to the photoredox system contained therein. These electrolytes contain one or more photosensitizing dyes which luminesce within the range of wavelengths absorbed by the photoredox system.

7 Claims, 2 Drawing Figures

ELECTROLYTES WHICH ARE USEFUL IN SOLAR ENERGY CONVERSION

GOVERNMENT SUPPORT

The Government has rights in this invention pursuant to Grant no. AER 72-03579 awarded by the National Science Foundation.

BACKGROUND OF THE INVENTION

1. Field of the Invention

This invention is in the field of solar energy conversion and more specifically in the field of photochemicl conversion of solar energy to electricity or to species capable of generating electricity.

2. Description of the Prior Art

Photogalvanic cells are devices which convert light directly into electrical energy. Such cells rely upon the excitation of a molecule by an absorbed photon to induce chemical reactions which yield high-energy products. These high-energy products subsequently lose their energy electrochemically. Such reactions are generally known as reversible, endergonic photochemical processes, which means reactions which are pushed uphill with light.

Typically, photogalvanic cells contain two electrodes which are placed in an electrolyte solution. The electrolyte solution contains chemical species sufficient to provide reversible redox reactions under light illumination. Typical ingredients in an electrolyte are a photoreducible or photooxidizable dye and a redox couple. Usually, one of the electrodes is maintained in the dark and the other is illuminated, but this is not always necessary.

There has recently been increased interest in photogalvanic cells for converting sunlight or solar energy into usable electrical energy. Those photogalvanic systems which are based upon iron-thionine have received particular attention. See, for example, Rabinowitch, E., J. Phys. Chem., 8, 551 and 560 (1940); Potter, A. E. and Thaller, L. H., Solar Energy, 3, 1 (1959); and Miller, L.J., Tech. Doc. Report No. ASD-TDR-62-373, May (1963). As the name implies, these photogalvanic systems depend upon electrolytes containing thionine, a photoreducible dye, and salts of iron which serves as the redox couple.

Despite this increased interest in photogalvanic cells in general, and iron-thionine cells in particular, engineering efficiencies whih have heretofore been obtained have been so low that these cells have not been viable competitors to other methods for converting solar energy into usable electrical energy. Low cell eficiencies are the result of several problems, including the narrow range of the solar spectrum which is absorbed, and therefore usable. In fact, only a fraction of the sunlight incident upon a photogalvanic cell is actually absorbed in the typical case. In the case of the iron-thionine systems, for example, it has been estimated that only about 10% of the total incident solar spectrum is absorbed by th thionine dye. See Clark, W. D. K. and Eckert, J. A., "Photogalvanic Cells," Solar Energy, 17, 147-150 (1975).

SUMMARY OF THE INVENTION

This invention relates to improved electrolyte systems for use in the photochemical conversion of solar energy. Such electrolytes contain one or more reversibly excitable photoredox reagents, e.g., photoreducible or photooxidizable dyes, and one or more reversible redox couples. The electrolytes of this invention additionally include at least one photosensitizing dye which luminesces in the range of wavelengths abosrbed by the excitable photoredox reagent. In many cases, it is preferred to use a plurality of photosensitizing dyes in the eletrolyte system.

Electrolyte systems including photosensitizing dyes as described herein have significant advantages over those previously used. For example, the range of wavelengths absorbed and/or the efficiency of energy absorbtion by the electrolyte system can be increased significantly. In many instances, the addition of more than one photosensitizing dye, at least one of which luminesces within the absorption range of the excitable photoredox reagent, produces a synergistic effect on energy output for photogalvanic or other such cells.

DESCRIPTION OF PREFERRED EMBODIMENTS

Figure 1:
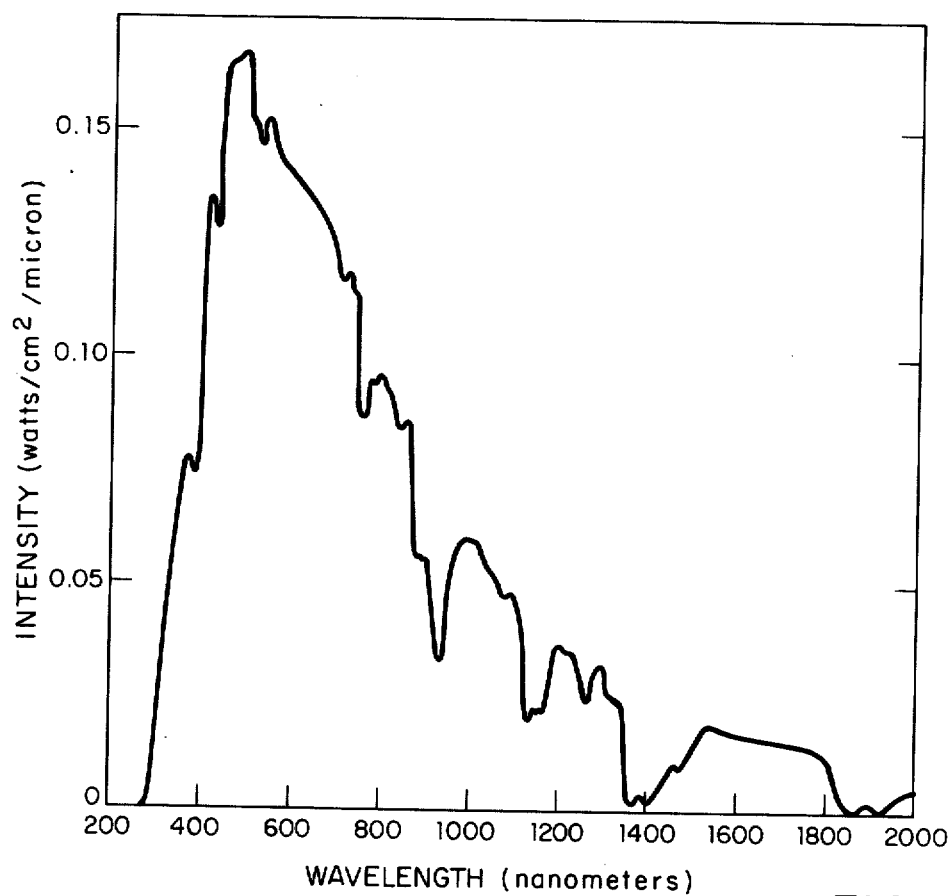
FIG. 1 is a plot illustrating the incident solar energy spectrum at the earth's surface under air mass one (AM1) conditions; and, FIG. 2 illustrates action spectra (current output as a function of incident energy wavelength) actually obtained for a thin layer iron-thionine photogalvanic cell containing a variety of electrolytes.

The electrolyte solutions of this invention contain three required constituents. These are: (1) at least one reversibly excitable photoredox reagent; (2) at least one reversible redox couple; and, (3) at least one photosensitizing dye. It is clear, or course, that additional constituents are often desirable, and electrolytes containing such additional constituents are certainly within the scope of this invention.

One class of materials which can function as reversibly excitable photoredox reagents is the class of photoreducible dyes. Some specific types of dyes includes: phenazine dyes, such as phenosafranine; xantchene dyes, such as eosin and erythrosin; and thiazine dyes, such as thionine, Methylene Blue, Toluidine Blue, Methylene Green, Methylene Azure, Thiocarmine R, Gentianine, C.I. Basic Blue, C.I. Basic Blue 24, and C.I. Basic Blue 25. Rhodamine B, Victoria Blue B, and chlorophyll are other suitable photoreducible dyes.

A preferred class of dyes of electrolytes useful in photogalvanic systems is the class of thiazine dyes, and thionine is an especially preferred dye because of the outstanding potential offerred by iron-thionine photogalvanic systems. Thionine is a purple dye, and a purple solution of thionine and iron salts, when exposed to sunlight, becomes colorless due to the formation of leucothionine. The purple color reappears in a matter of seconds when th solution is removed from the sunlight. This sequence can be performed repeatedly which demonstrates the reversibility of electrolyte systems based upon iron-thionine.

There are many complex reactions involved in photogalvanic cells based on iron-thionine, but the overall reaction can be simply illustrated as follows:

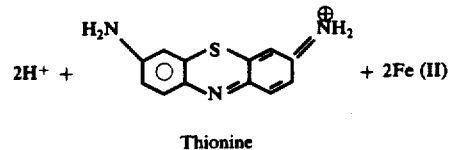

Thionine

-continued

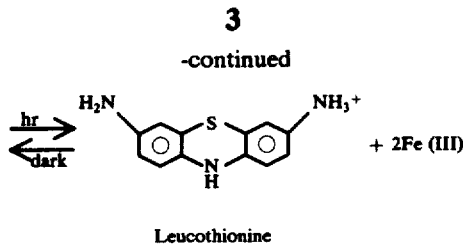

Leucothionine

Another suitable class of materials which can function as suitable excitable photoredox reagents is the class of photooxidizable dyes. Certain transition metal complexes which can be elevated to an excited state by solar energy are included in this class. It has been demonstrated, for example, that complexes of ruthenium (II) or Osmium (II) such as tris (2,2'-bipyridine) ruthenium or tris (2,2'-bipyrine) osmium (II), can be elevated to an excited state by sunlight. Quenching of the excited state can then be done with oxidizing agents, including $O_2$, $Fe^{+3}$, $Co(phen)^{+3}$, $Ru(NH_3)_6^{+3}$, $Os(bpy)_3^{+3}$, and $Fe(CN^3)_6^{-3}$. For a more comprehensive description of these transition metal complexes, see the following references, the teachings of which are hereby incorporated by reference: Lin, C-T, and Sutin, N., "Quenching of the Luminescence of the Tris (2,2'-bipyridine) Complexes of Ruthenium (II) and Osmium (II), Kinetic Considerations and Photogalvanic Effects," *J. PHys. Chemistry*, 30, 97 (1976); and, Young, R. C., Meyer, T. J., Whitten, D. G., "Kinetic Relaxation Measurement of Rapid Electron Transfer Reactions by Flash Photolysis." "The Conversion of Light Energy into Chemical Energy Using the $Ru(bpy)_3^{3+}$—$Ru(bpy)_3^{2+*}$ Couple," *J. Am. Chem. Soc.*, 97:16, Aug. 6, 1975.

Although many of the excitable photoredox reagents specifically enumerated are "dyes," it is not believed that this is a requirement for these materials. The basic requirement for suitable reagents is that they be capable of undergoing a reversible, endergonic photochemical reaction in response to illumination with and removal from sunlight.

Electrolytes can contain, of course, more than more excitable photoredox reagent. The addition of more than one photoredox dye, for example, does tend to increase the range of wavelenghts which is absorbed by the electrolyte. For example, thionine dye absorbs in the range of about 500 to 630 nanometers (nm), and the addition of Methylene Blue to a thionine system will extend the absorbance to about 700 nm. While this does provide some widening of the range of wavelengths abosorbed, the extension is at the highe wavelengths. It can be appreciated by referring to FIG. 1, however, that it is also desirable to extend the range of abosrbed wavelenghts at the lower wavelengths to absorb larger portions of the solar spectrum.

Photosensitizing dyes are suitable as long as they strongly absorb within the solar spectrum and luminesce within the range of wavelengths absorbed by the photoredox reagent. Strong absorbance is required because it is usually only possible to use small concentrations of these dyes due to solubility considerations. While the exact mechanisms which result in the marked improvement in electrolytes according to this invention are not fully understood, it is known that the photosensitizing dyes which produce such effects are those that luminesce in the absorption band of the photoredox reagent. It is possible, and many times desirable, to use more than one photosentizing dye in these electrolytes.

For conversion of solar energy in photogalvanic cells based on iron-thionine systems, it is preferred to have photosensitizing dyes which strongly absorb in the range of about 350–600 nm and which luminesce in the range of about 500–700 nm. It is also preferred to use photosensitizing dyes in iron-thionine systems which have good solubility in polar solvents and good stability and acid solutions. Polar solvents are preferred in such systems in order to gain the concentrations of thionine desirable, and acid solutions are used to prevent iron from complexing and precipitating out.

A particularly preferred photosensitizing dye for use in electrolytes of this invention is Rhodamine 6G. This dye has the structural formula:

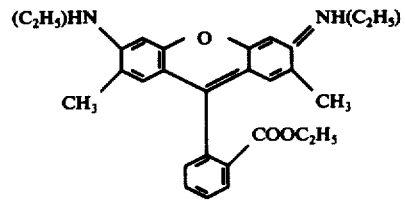

Rhodamine 6G is effective both in sensitizing a thionine solution to the solar spectrum and in increasing the power output of an iron-thionine photogalvanic cell.

Another effective sensitizing dye, particularly for thionine systems, is CSA-28, which has the structural formula:

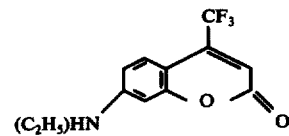

Other sensitizing dyes, such as Acridine Orange, are not as effective at sensitizng if used alone, but work well when they are used combination with other sensitizing dyes such as Rhodamine 6G.

The other essential ingredient in the electrolyte is a reversible redox couple. This is a material capable of reducing or oxidizing the excited photoredox reagent. Suitable reducing agents can be provided by salts of iron, such as ferrous sulfate, or salts of cobalt which are complexed with a chelating agent, or hydroquinone. Suitable oxidizing agents include ferric salts, etc.

The electrolyte is based upon a solvent, which may be aqueous or nonaqueous. For certain dyes, including thiazine type dyes such as thionine, polar solvents are preferred because these dyes have better solubility in such solvents. Aqueous solutions, including miscible polar solvents, can also be used.

In principle, the electrolyte solution can be neutral, acidic or basic. When certain redox couples, such as salts of iron are used, however, it is preferred to use acidic solutions to prevent preciptation of insoluble hydroxides, such as ferric hydroxide.

There are many equivalents to the specific excitable photoredox reagents, photosensitizing dyes, redox couples, solvents, and other constituents described herein. Such equivalents will be recognized by those skilled in the art, or can be determined by such persons using no more than routine experimentation.

The invention is further illustrated by the following examples. All parts and percentages are by weight, unless otherwise specified.

EXAMPLES 1-15

Cell current action spectra were produced by plotting data produced by a totally illuminated thin layer photogalvanic cell described previously by W. D. K. Clark and J. A. Eckert in *Solar Energy*, 17, 147 (1975). This cell employed a transparent semiconductor anode formed from $SnO_2$ on a low-alkali glass substrate obtained form Corning Glass. The anode was about 90% transmitting in the wavelength range of 400 to 700 nm. The cathode was a thin film of platinum sputtered on glass. These electrodes were separated by 80 $\mu$m thick Teflon spacers and the resultant solution chamber was filled by capillary action.

Dye solutions tested in the cell were prepared by dissolving weighed amounts of the crystalline dyes in appropriate volumes of a solvent mixture consisting of 50% (v/v) aqueous acetonitrile with 0.01N sulfuric acid. In all cases tested, the thionine, Methylene Blue and Azure A concentrations were each 0.001M; the photosensitizing dyes were each present in a concentration of 0.003M.

A stock ferrous sulfate solution about 1.0M in Fe(II) was prepared by dissolving solid $FeSO_4 \cdot 7 H_2O$ in 0.01M aqueous sulfuric acid. The solution was stored under argon. Precise concentrations of Fe(II) and Fe(III) in the stock solution were determined spectrophotometrically by dilution and formation of a complex with 1,10-phenanthroline for Fe(II) and directly as $Fe_2(SO_4)_3$ for Fe(III). The cell solutions were made 0.01M in Fe(II) by addition of the required amount of the stock solution and about $2 \times 10^{-4}$M with $Fe_2(SO_4)_3$. An excitation lamp (150W xenon with Corning 0-53 glass filter) and scanning monochromator from a Perkin Elmer MPF-2A spectrofluorimeter were used as the excitation source for recording cell current vs. wavelength. Cell current was monitored with a Keithley 610 electrometer coupled to a Houston Instruments Model 2000 recorder. Corrections were made for variations in the intensity of exciting light with wavelength in the range of 400 - 600 nm. In most cases, cell power output expressed as the product of open-circuit current times short-circuit voltage under high intensity white light (150W xenon lamp producing intensity equal to 70 milliwatts/$cm^2$ of sunlight) was also determined.

Figure 2:
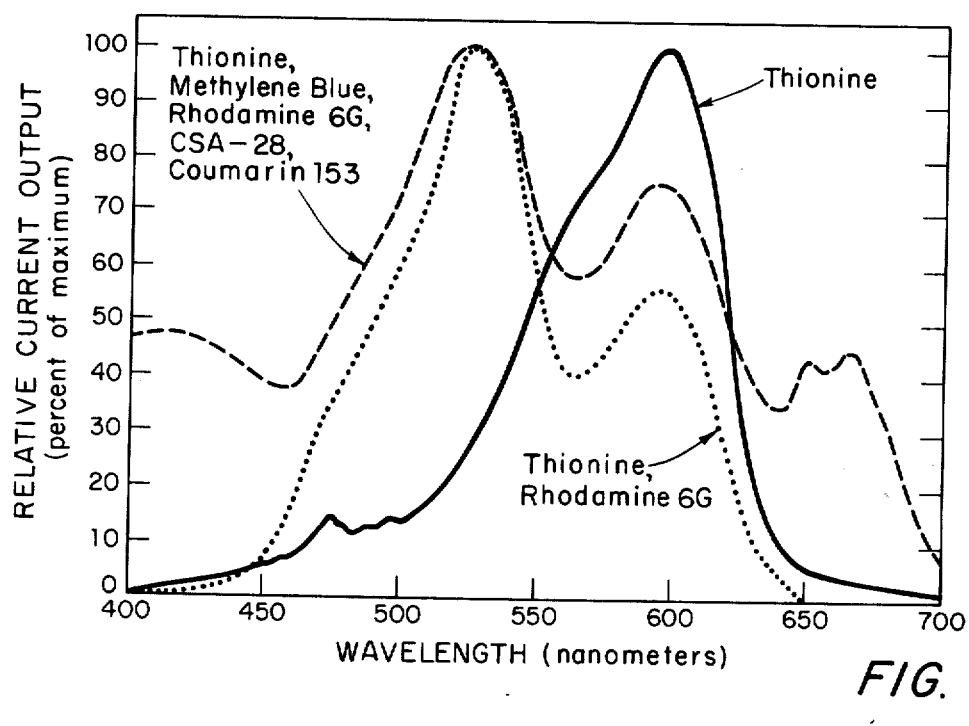

The data obtained are summarized in the following table, and the cell current action spectra for Examples 1, 2 and 13 are illustrated in FIG. 2.

| Example | Photoredox Reagent(s) | Photosensitizer(s) | Comments |
|---|---|---|---|
| 1 | Thionine | — | action spectrum was very similar to absorption spectrum of solution; |
| 2 | Thionine | Rhodamine 6G | action spectrum was very similar to absorption spectrum of solution; noticeably higher power output than a solution containing only the photoredox reagent; |
| 3 | Thionine | CSA-28 | action spectrum was very similar to absorption spectrum of solution; power output was similar to a solution containing only the photoredox reagent; |
| 4 | Thionine | Coumarin 153 | action sectrum was very similar to absorption spectrum of solution; power output was lower than a solution containing only the photoredox reagent; |
| 5 | Thionine | Acridine Orange | power output was similar to a solution containing only the photoredox reagent; comparison of the cell current action spectrum with the solution absorption spectrum indicated that, although light which was absorbed by either the photoredox reagent or the sensitizer produced some current, light absorbed by the sensitizer was much less effective; |
| 6 | Thionine | Rhodamine 6G; CSA-28 | action spectrum was very similar to absorption spectrum of solution; noticeably higher power output than a solution containing only the photoredox reagent; |
| 7 | Thionine | Rhodamine 6G; Coumarin 153 | action spectrum was very similar to absorption spectrum of solution; |
| 8 | Thionine | Rhodamine 6G; Coumarin 153; CSA-28 | action spectrum was very similar to absorption spectrum of solution; |
| 9 | Methylene Blue | — | action spectrum was very similar to absorption spectrum of solution; |

-continued

| Example | Photoredox Reagent(s) | Photosensitizer(s) | Comments |
|---|---|---|---|
| 10 | Methylene Blue | Rhodamine 6G | action spectrum was very similar to absorption spectrum of solution; |
| 11 | Methylene Blue | CSA-28 | action spectrum was very similar to the absorption spectrum of the photoredox reagent; |
| 12 | Thionine; Methylene Blue | — | action spectrum was very similar to absorption spectrum of solution; |
| 13 | Thionine; Methylene Blue | Rhodamine 6G; CSA-28 Coumarin 153 | action spectrum was very similar to absorption spectrum of solution; |
| 14 | Azure A | Coumarin 153 | action spectrum was very similar to absorption spectrum of solution; |
| 15 | Azure A | Rhodamine 6G | action spectrum was very similar to absorption spectrum of solution; noticeably higher power output than a solution containing only the photoredox reagent. |

What is claimed is:

1. An electrolyte for use in a photogalvanic cell comprising a solvent having a thiazine dye and a photosensitizing dye dissolved therein, said photosensitizing dye being selected from the group consisting of Rhodamine 6G, CSA-28, and a combination of both.

2. An electrolyte of claim 1 wherein said electrolyte contains additional photoreducible dyes.

3. An electrolyte of claim 2 wherein said electrolyte contains additional photosensitizing dyes.

4. In an electrolyte solution useful in the photochemical conversion of solar energy, said electrolyte containing a photoreducible thiazine dye and a redox couple, the improvement of including in said electrolyte solution a photosensitizing dye selected from the group consisting of Rhodamine 6G, CSA-28, and a combination of both.

5. The improvement of claim 4 wherein said photoreducible thiazine dye is selected from the group consisting of thionine, Methylene Blue, and Azure A.

6. The improvement of claim 4 wherein said photoreducible thiazine dye comprises thionine.

7. The improvement of claim 6 wherein said photosensitizing dye comprises Rhodamine 6G.

* * * * *